(12) United States Patent
Hayashida et al.

(10) Patent No.: US 9,458,306 B2
(45) Date of Patent: Oct. 4, 2016

(54) FLUOROSILICONE RUBBER COMPOUND AND RUBBER PART FOR USE NEAR CARGO PLANE ENGINES

(71) Applicant: SHIN-ETSU CHEMICAL CO., LTD., Tokyo (JP)

(72) Inventors: Osamu Hayashida, Annaka (JP); Atsuhito Kashima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/850,132

(22) Filed: Sep. 10, 2015

(65) Prior Publication Data

US 2016/0075853 A1 Mar. 17, 2016

(30) Foreign Application Priority Data

Sep. 11, 2014 (JP) .................................. 2014-185146

(51) Int. Cl.
| | |
|---|---|
| *C08K 3/36* | (2006.01) |
| *C08K 3/04* | (2006.01) |
| *C08L 83/08* | (2006.01) |
| *C08G 77/20* | (2006.01) |
| *C08G 77/24* | (2006.01) |

(52) U.S. Cl.
CPC . *C08K 3/36* (2013.01); *C08K 3/04* (2013.01); *C08L 83/08* (2013.01); *C08G 77/20* (2013.01); *C08G 77/24* (2013.01)

(58) Field of Classification Search
CPC ............ C08K 3/36; C08K 3/04; C08L 83/08
See application file for complete search history.

(56) References Cited

U.S. PATENT DOCUMENTS

| 4,988,758 A | 1/1991 | Fukuda et al. |
| 5,059,668 A | 10/1991 | Fukuda et al. |
| 5,342,879 A | 8/1994 | Takahashi et al. |
| 2005/0038217 A1 | 2/2005 | Ahn et al. |

FOREIGN PATENT DOCUMENTS

| CN | 102382366 | * | 3/2012 |
| EP | 0 667 373 A2 | | 8/1995 |
| JP | 62-174260 A | | 7/1987 |
| JP | 7-252421 A | | 10/1995 |
| JP | 2729871 B2 | | 3/1998 |
| JP | 3497381 B2 | | 2/2004 |

OTHER PUBLICATIONS

CN 102382366 machine traslation (2012).*
Extended Search Report dated Nov. 27, 2015, issued in counterpart European Patent Application No. 15183329. (7 pages).

* cited by examiner

*Primary Examiner* — Kuo-Liang Peng
(74) *Attorney, Agent, or Firm* — Westerman, Hattori, Daniels & Adrian, LLP; Sadao Kinashi

(57) ABSTRACT

A fluorosilicone rubber composition is provided. This composition comprises (A) 100 parts by weight of a fluorosilicone rubber compound, (B) 0.1 to 10 parts by weight of an activated carbon at a pH of up to 9, and (C) a catalytic amount of a curing catalyst. The fluorosilicone rubber composition of the invention can be used in producing a fluorosilicone rubber molded article (cured article) which is less likely to experience loss of its physical properties when brought in contact with an amine antiaging agent. Such fluorosilicone rubber molded article is suitable for use in applications such as rubber parts used near cargo plane engines.

4 Claims, No Drawings

FLUOROSILICONE RUBBER COMPOUND AND RUBBER PART FOR USE NEAR CARGO PLANE ENGINES

CROSS-REFERENCE TO RELATED APPLICATION

This non-provisional application claims priority under 35 U.S.C. §119(a) on Patent Application No. 2014-185146 filed in Japan on Sep. 11, 2014, the entire contents of which are hereby incorporated by reference.

TECHNICAL FIELD

The present invention relates to a fluorosilicone rubber composition which can be used in producing a fluorosilicone rubber having excellent amine resistance which is less likely to experience, loss of its physical properties when brought in contact with amines used as antiaging agents in the fuels used in cargo plane engines. This invention also relates to a rubber part for use near cargo plane engines comprising a fluorosilicone rubber cured product.

BACKGROUND ART

Silicone rubber compositions have been used in various fields because of their excellent handling convenience, moldability, heat resistance, after the molding, cold resistance, weatherability, electric insulation, and the like. In particular, the fluorosilicone rubber composition mainly comprising the fluorosilicone raw rubber substantially constituted from the repetition of (3,3,3-trifluoropropyl)-methylsiloxane unit having 3,3,3-trifluoropropyl group as the substituent on the side chain of the backbone of the base polymer has excellent solvent resistance, and therefore, it is widely used as a material or parts in a cargo plane, parts in petroleum-related appliance, and the like, namely, as a material for diaphragm, O-ring, oil seal, and the like.

However, fluorosilicone rubbers are incapable of maintaining the as-molded initial physical properties when they are brought in contact with amines added as an antiaging agent or anticorrosive in gasoline fuel and oil due to cracking of the siloxane backbone. Exemplary such amines include polyether amines, alcohol amines, alkylamines, and the like, and various attempts have been made to improve durability to fuel oil and durability to the amine antiaging agent of these fluorosilicone rubbers.

However, it has been difficult to sufficiently suppress the cracking caused by contact with the amine in the case of the fluorosilicone rubber.

CITATION LIST

Patent Document 1: JP-A H07-252421
Patent Document 2: JP 2729871
Patent Document 3: JP 3497381

DISCLOSURE OF INVENTION

An object of the present invention is to provide a fluorosilicone rubber composition, and in particular, a millable fluorosilicone rubber composition which can be used in producing a fluorosilicone rubber having excellent amine resistance which is less likely to experience loss of its physical properties when brought in contact with amines used as an antiaging agent. Another object of the present invention is to provide a rubber part for use near cargo plane engines comprising a fluorosilicone rubber cured product.

A millable composition is a composition which is non-liquid (paste or solid) at room temperature, (25° C.) with no self-flowability, and which can be uniformly mixed by a kneading means such as roll mill under shear stress.

The present invention has been completed in the course of solving the problems as described above, and the inventors found that loss of physical properties of a fluorosilicone rubber when brought in contact with an amine antiaging agent can be suppressed by adding a particular type of activated carbon to the fluorosilicone rubber composition. The present invention has been completed on the basis of such finding.

In the present invention, a fluorosilicone rubber is a silicone rubber mainly comprising a base polymer having a unique molecular structure such that, in the straight chain diorganopolysiloxane of the have polymer, most (for example, at least 90% by mole, and in particular, at least 95% by mole) of the diorganosiloxane unit constituting the backbone comprises (3,3,3-trifluoropropyl)organosiloxane unit, and substantially 50.0% by mole of the unsubstituted or substituted monovalent hydrocarbon group bonded to the silicon atom is 3,3,3-trifluoropropyl group, the number of the 3,3,3-trifluoropropyl group being substantially the same as the number of silicon atoms in the molecule. Since the fluorosilicone rubber mainly comprises such base polymer having a unique molecular structure, it is essentially different from ordinary silicone rubber mainly comprising the base polymer of dimethylpolysiloxane or the like in their nature and physical properties.

Accordingly, the present invention provides a fluorosilicone rubber composition as described below, and also a rubber part for use near cargo plane engines comprising a fluorosilicone rubber cured product obtained by curing the fluorosilicone rubber composition.

[1] A fluorosilicone rubber composition comprising the following components (A), (B) and (C):
 (A) 100 parts by weight of a fluorosilicone rubber compound,
 (B) 0.1 to 10 parts by weight of an activated carbon at a pH of up to 9, and
 (C) a catalytic amount of a curing catalyst.

[2] The fluorosilicone rubber composition according to [1] wherein the fluorosilicone rubber compound (A) comprises
 (a) 100 parts by weight of a fluorosilicone raw rubber, and
 (b) 2 to 100 parts by weight of a reinforcement silica.

[3] The fluorosilicone rubber composition according to [1] or [2] wherein the activated carbon (B) has an average particle size of up to 80 μm.

[4] A rubber part to be used near cargo plane engines comprising a fluorosilicone rubber cured product obtained by curing the fluorosilicone rubber composition of any one of [1] to [3].

Advantageous Effects of Invention

The fluorosilicone rubber composition of the present invention can be used in producing a fluorosilicone rubber molded article (cured product) having excellent amine resistance which is less likely to experience loss of its physical properties when brought in contact with amines antiaging agent, and the molded article produced by using the fluorosilicone rubber is particularly adapted for use in the application such as rubber parts near the cargo plane engines.

DESCRIPTION OF PREFERRED EMBODIMENTS

Next, the present invention is described in further described in detail.

(A) Fluorosilicone rubber compound.

The component (A) of the present invention is a fluorosilicone rubber compound which comprises:

(a) 100 parts by weight of a fluorosilicone raw rubber, and (b) 2 to 100 parts by weight of a reinforcement silica.

Next, each component is described.

(a) Fluorosilicone Raw Rubber

The fluorosilicone raw rubber (a) which is the main component (base polymer) of the fluorosilicone rubber compound (A) is a substantially straight chain trifluoropropyl group-containing organopolysiloxane raw rubber represented by the following average, compositional formula (1):

wherein most (for example, at least 90% by mole, and in particular, at least 95% by mole) of the diorganosiloxane unit constituting the backbone comprises (3,3,3-trifluoropropyl)organosiloxane unit, and 45 to 52% by mole, more preferably 48 to 51% by mole, and still more preferably 49.5 to 50.0% by mole of the unsubstituted or substituted monovalent hydrocarbon group bonded to the silicon atom is 3,3,3-trifluoropropyl group, the number of the 3,3,3-trifluoropropyl group being substantially the same as the number of silicon atoms in the molecule.

It is to be noted that a raw rubber is a high polymer which is an extremely viscous liquid having a viscosity of at least 1,000,000 mPa·s, and in particular, at least 10,000,000 mPa·s at room temperature (25° C.) or a non-liquid (paste or solid) with no self-fluidity. In the present invention, the viscosity can be measured, for example, with a rotary viscometer (BL, BH, BS, cone plate, rheometer, etc.).

In the formula (1), $R^1$ is trifluoropropyl group; $R^2$ is an unsubstituted or substituted monovalent aliphatic unsaturated hydrocarbon group containing 2 to 8 carbon atoms, for example, an alkenyl group such as vinyl group, allyl group, propenyl group, isopropenyl group, butenyl group, isobutenyl group, or hexenyl group; R an unsubstituted monovalent aliphatic saturated hydrocarbon group containing 1 to 8 carbon atoms or an aromatic hydrocarbon group, for example, an alkyl group such as methyl group, ethyl group, propyl group, isopropyl group, butyl group, isobutyl group, tert-butyl group, or hexyl group, an aryl group such as phenyl group or tolyl group, or an aralkyl group such as benzyl group, with the proviso that, when $R^3$ is the one bonding to the silicon atom at the terminal of the molecular chain, a part of the $R^3$ may be hydroxy group (silanol group); and a, b, and c are respectively a positive number satisfying the conditions that a is 0.96 to 1.01, b is 0.0001 to 0.01, c is 0.96 to 1.06, and a+b+c is 1.98 to 2.02.

In this organopolysiloxane, the organopolysiloxane should have at least two monovalent aliphatic unsaturated hydrocarbon groups $R^2$ in one molecule, and 0.01 to 1% by mole, and in particular, 0.02 to 0.5% by mole of the monovalent aliphatic unsaturated hydrocarbon groups $R^2$ is present in relation to the number of silicon atoms in the molecule, and this group is preferably an alkenyl group, and in particular, vinyl group. $R^2$ may be located at the end of the backbone, at the side chain, or at both the end of the backbone and on the side chain. When the monovalent aliphatic unsaturated hydrocarbon group is in excess of 1% by mole, the rubber hardness may increase to the extent not suitable for practical use, or the rubber may become brittle to detract from mechanical strength including the tensile strength, tear strength, and the like.

The organopolysiloxane represented by the general formula (1) can be obtained, for example, by ring-opening polymerization of (trifluoropropyl)methylsiloxane cyclic trimer using the siloxane oligomer represented by the following formula (2):

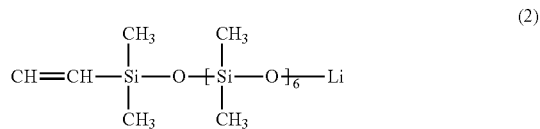

for the initiator as described in JP-A S62-174260 corresponding to U.S. Pat. No. 4,988,758 and U.S. Pat. No. 5,059,668.

The silica filler (b) is the reinforcing filler required for obtaining the silicone rubber compound having excellent mechanical strength. The silica filler (b) is typically selected by considering the required physical strength, heat resistance, and the like from those having a specific surface area measured by BET method of 50 m²/g to 380 m²/g. Such silica filler may be either a fumed silica (dry silica) or a precipitated silica (wet silica). If desired, the silica filler may have its surface preliminarily treated with organopolysiloxane, organopolysilazane, chlorosilane, alkoxysilane, or the like. This silica filler may be added at 2 to 100 parts by weight, and preferably 5 to 60 parts by weight in relation to 100 parts by weight of the organopolysiloxane(fluorosilicone raw rubber) (a). Addition of less than 2 parts by weight is insufficient for realizing the sufficient reinforcing effects whereas addition in excess of 100 parts by weight results in the poor workability as well as poor physical properties of the resulting silicone rubber.

(B) Activated Carbon Having a pH of Up to 9

The activated carbon of component (B) is a critical component of the present invention, and it suppresses cracking of the siloxane chain by the amine antiaging agent. Conceivably, the cracking of the siloxane chain by the amine is suppressed by adsorption by the minute pores and fixing by the surface carbonyl group.

Known activated carbons include those derived from coal, wood, coconut husk, and the like, and the preferred is those derived from wood and coconut husk in view of the well-developed fine pore structure. The activated carbon of component (B) needs to have a pH of up to 9, preferably 5.5 to 9, more preferably 6.0 to 8.5, and still more preferably 6.5 to 8.0, and the preferable means used for controlling the pH to the range of up to 9 is washing of the surface with an acid. The activated carbon having a pH in excess of 9, and in particular, a pH in excess of 10 has an alkaline metal (Na, K) remaining on the surface of the activated carbon, and this may result in the cracking of the fluorosilicone backbone. This results in the worsening of the compression set and heat resistance. The pH value (the value of hydrogen ion concentration) of the activated carbon may be measured according to the procedure defined in JIS K 1474 (activated carbon test method) 7.11 (namely, by boiling under predetermined conditions after adding water, and measuring the pH of the boiled solution).

With regard to the particle size of the activated carbon, the activated carbon may have an average particle size of up to 80 µm, and more preferably up to 70 µm. When the average particle size is in excess of 80 µm, the fluorosilicone rubber may suffer from loss of physical strength. Lower limit of the average particle size is preferably at least 0.01 μm, and preferably at least 0.1 μm. The average particle size may be determined, for example, as a cumulative weight average diameter ($D_{50}$) (or median diameter) by particle size distribution measurement by laser diffractometry using a commercially available laser diffraction/scattering particle size distribution analyzer or the like.

Recommended activated carbons include Shirasaqi AS (derived from wood) and FP-3 (derived from corn husk) which are products of Japan EnviroChemicals, Limited.

Amount of the activated carbon added is preferably 0.1 to 10 parts by weight, more preferably 0.3 to 5 parts by weight, and still more preferably 0.5 to 3 parts by weight in relation to 100 parts by weight of the fluorosilicone rubber compound component (A). The merit of adding the component (B) is not realized by the addition of less than 0.1 part by weight while addition in excess of 10 parts by weight results in the reduced physical strength of the cured fluorosilicone rubber article.

(C) Curing Catalyst

The curing catalyst (C) is used by adding the curing catalyst (C) to the mixture of the fluorosilicone rubber compound (A) and the activated carbon (B) and uniformly stirring the mixture to prepare the fluorosilicone rubber composition and further curing by vulcanization by the method commonly used in the art to obtain the fluorosilicone rubber cured product. The curing by vulcanization may be accomplished by using a curing catalyst known in the art which is preferably an organic peroxide. Exemplary such curing catalysts include benzoyl peroxide, tertiary butyl perbenzoate, o-methylbenzoyl peroxide, p-methylbenzoyl peroxide, di-tertiary butyl peroxide, dicumyl peroxide, 1,1-bis(tertiary butylperoxy)3,3,5-trimethylcyclohexane, 2,5-dimethyl-2,5-di(tertiary butylperoxy)hexane, and 2,5-dimethyl-2,5-di(tertiary butylperoxy)hexyne, which may be used alone or in combination of two or more. The amount of the curing catalyst incorporated may be a catalytic amount, and in the case of organic peroxide, it may be used at approximately 0.1 to 5 parts by weight in relation to 100 parts by weight of the fluorosilicone rubber compound (A).

Alternatively, addition curing using a platinum-base catalyst and an organohydrogenpolysiloxane having 2 or more hydrogen atoms directly bonded to the silicon atom (SiH groups) for the curing agent may also be conducted. In this case, the platinum-base catalyst is preferably used in an amount of approximately 1 to 2,000 ppm in terms of the platinum-group catalyst in relation to the fluorosilicone rubber compound (A). The organohydrogenpolysiloxane is preferably used in an amount that enables supplying of the SiH groups of the organohydrogenpolysiloxane at a rate of 0.5 to 5 SiH groups per monovalent aliphatic unsaturated hydrocarbon group in the fluorosilicone raw rubber (a) which is the base polymer of the component (A).

If desired, the fluorosilicone rubber composition of the present invention may also contain additives such as non-reinforcing silica such as pulverized quartz and diatomaceous earth, carbon blacks such as acetylene black, furnace black, and channel black, fillers such as calcium carbonate, flame retardants, acid acceptor, heat conduction improver, and the like as well as dispersants such as alkoxysilane, diphenylsilane diol, carbon functional silane, and low molecular weight siloxane capped at opposite end with silanol.

In addition to the components as described above, the fluorosilicone rubber composition of the present invention may also contain optional components such as heat resistance improver, for example, cerium compound or iron oxide, antiaging agent, colorant, and mold release agent which are known additives of the silicone rubber composition to the extent not adversely affecting the merits of the present invention.

The fluorosilicone rubber composition of the present invention for obtaining the fluorosilicone rubber molded article (cured rubber article) may be prepared by uniformly mixing the components as described above by using a rubber kneader such as double-rolls, Banbury mixer, or dough mixer (kneader).

The method used in the molding of the fluorosilicone rubber composition is not particularly limited, and the fluorosilicone rubber composition may be molded to any desired shape by the method such as compression molding, transfer molding, injection molding, extrusion molding, and calendar molding commonly used in the rubber molding to produce a rubber molded article such as O-ring, diaphragm, packing, and gasket. In this case, the curing may be conducted at a temperature of typically 120 to 400° C. and preferably 130 to 220° C. for approximately 1 to 40 minutes and preferably 5 to 30 minutes. If desired, secondary vulcanization (post-curing) may be conducted at 180 to 250° C., and in particular, at 200 to 240° C. for 1 to 10 hours.

Recommended applications for the molded article obtained in the present invention are rubber parts used in contact with fuels and oils near the cargo plane engines.

EXAMPLES

Next, the present invention is described in further detail by referring to the Examples and Comparative Examples which by no means limit the scope of the present invention.

The pH value of to activated carbon is the one measured by JIS K 1474, 7.11 and the average particle size is cumulative weight average diameter ($D_{50}$) measured by laser diffraction.

Example 1 and Comparative Examples 1 and 2

40 parts by weight of dry silica (product name, Aerosil 130 manufactured by Nippon Aerosil Co.) having a specific surface area of 130 $m^2/g$ and 10 parts by weight of diphenylsilane diol (dispersant) were added in relation to 100 parts by weight of the fluorosilicone raw rubber represented by the following formula (3) (vinyl group content, 0.30% by mole in relation to the number of silicone atoms in the molecule, this also applies to the following description), and the mixture was uniformly kneaded by a double-roll. After 4 hour heat treatment at 150° C., the mixture was peptized and plasticized by a double-roll to obtain fluorosilicone base compound A which was used as the base.

Next, 1 part by weight of activated carbon FP-3 (a product manufactured by Japan EnviroChemicals, Limited) having an average particle size of 40 μm at pH 7.6 was thoroughly dispersed in 150 parts by weight of this fluorosilicone base compound. A by using a double-roll (Example 1).

For comparative purpose, the procedure was repeated by using 1 part by weight of activated carbon FPG-1 (a product manufactured by Japan EnviroChemicals, Limited) having an average particle size of 10 μm at pH 10 in Comparative Example 1, and without adding the activated carbon component in Comparative Example 2.

To 100 parts by weight of each of the resulting compound, 1 part by weight of cerium oxide having an average particle size of 3 μm and a specific surface area of 130 $m^2/g$ and 0.8 part by weight of a paste containing 80% by weight of 2,5-dimethyl-2,5-di(t-butylperoxy)hexane were added. The mixture was uniformly mixed by using a double-roll to prepare 3 types of fluorosilicone rubber full compounds (fluorosilicone rubber compositions).

[Measurement of Amine Durability]

The amine durability was evaluated by measuring the compression set after immersing in an amine. The measurement was conducted according to JIS K 6262. After curing the resulting full compound by pressing under pressure at 165° C. for 10 minutes, a post curing at 200° C. was conducted for 4 hours to prepare a small columnar test piece having a diameter of 13 mm and a height of 6.3 mm for use in the measurement of the compression set. The resulting test piece was immersed in a 10% by weight solution of N,N'-di-sec-butyl-p-phenylenediamine solution in ethanol for 24 hours, and after air-drying at room temperature for 1 day, the 25% compression set was measured at 150° C.

The compression set without conducting the immersion was also measured for comparison purpose. The results are shown in Table 1.

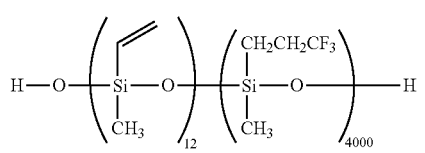

(3)

TABLE 1

| Composition (parts by weight) | | Example 1 | Comparative Example 1 | Comparative Example 2 |
|---|---|---|---|---|
| Base compound A | | 100 | 100 | 100 |
| Cerium oxide powder | | 1 | 1 | 1 |
| Vulcanizer paste | | 0.8 | 0.8 | 0.8 |
| Initial physical properties | Activated carbon FP-3 | 1 | | |
| | Activated carbon FP-G-1 | | 1 | |
| Compression set (%) | after 72 hours at 150° C. | 4 | 10 | 5 |
| | after 144 hours at 150° C. | 5 | 13 | 6 |
| Compression set (%) after immersion in 10% by weight solution of N,N'-di-sec-butyl-p-phenylenediamine in ethanol | after 72 hours at 150° C. | 12 | 15 | 85 |
| | after 144 hours at 150° C. | 16 | 16 | 95 |

Example 2 and Comparative Example 3

40 parts by weight of dry silica (product, name Aerosil 130 manufactured by Nippon Aerosil Co.) having a specific surface area of 90 m²/g and 10 parts by weight of diphenylsilane diol (dispersant) were added to each of 100 parts by weight of the fluorosilicone ram rubber represented by the following formula (4) (vinyl group content, 0.40% by mole), and the mixture was uniformly kneaded. After 4 hour heat treatment at 150° C., the mixture was peptized and plasticized by a double-roll to obtain fluorosilicone base compound B which was used as the base.

Next, 1 part by weight of activated carbon Shirasagi AS (a product manufactured by Japan EnviroChemicals, Limited) having an average particle size of 70 μm at pH 5.5 was thoroughly dispersed by using a double-roll (Example 2).

For comparative purpose, the procedure was repeated by adding 0.05 part by weight of activated carbon Shirasagi AS in Comparative Example 3.

To 100 parts by weight of the resulting compound, 1 part by weight of cerium oxide having an average particle size of 3 μm and a specific surface area of 130 m²/g and 0.8 part by weight of a paste containing 80% by weight of 2,5-dimethyl-2,5-di(t-butylperoxy)hexane were added. The mixture was uniformly mixed by using a double-roll to prepare 2 types of fluorosilicone rubber full compounds (fluorosilicone rubber compositions).

The amine durability was evaluated by immersion by repeating the evaluation procedure of Example 1 except that the amine selected was N,N'-bis(salicylidene)-1,2-propanediamine.

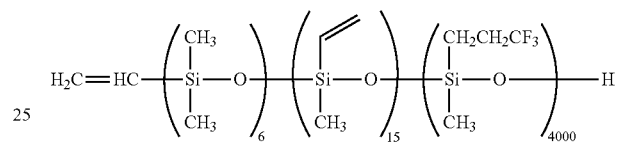

(4)

TABLE 2

| Composition (parts by weight) | | Example 2 | Comparative Example 3 |
|---|---|---|---|
| Base compound B | | 100 | 100 |
| Cerium oxide powder | | 1 | 1 |
| Vulcanizer paste | | 0.8 | 0.8 |
| Initial physical properties | Activated carbon Shirasagi AS | 1 | 0.05 |
| Compression set (%) | after 72 hours at 150° C. | 6 | 4 |
| | after 144 hours at 150° C. | 9 | 9 |
| Compression set (%) after immersion in 10% by weight solution of N,N'-bis(salicylidene)-1,2-propanediamine in ethanol | after 72 hours at 150° C. | 18 | 18 |
| | after 144 hours at 150° C. | 20 | 43 |

Japanese Patent Application No. 2014-185146 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorosilicone rubber composition comprising the following components (A), (B) and (C):
 (A) 100 parts by weight of a fluorosilicone rubber compound,
 (B) 0.1 to 10 parts by weight of an activated carbon at a pH of up to 9, and
 (C) a catalytic amount of a curing catalyst.

2. The fluorosilicone rubber composition according to claim 1 wherein the fluorosilicone rubber compound (A) comprises
 (a) 100 parts by weight of a fluorosilicone raw rubber, and
 (b) 2 to 100 parts by weight of a reinforcement silica.

3. The fluorosilicone rubber composition according to claim 1 wherein the activated carbon (B) has an average particle size of up to 80 μm.

4. A rubber part to be used near cargo plane engines comprising a fluorosilicone rubber cured product obtained by curing the fluorosilicone rubber composition of claim 1.

\* \* \* \* \*